United States Patent
Ozturk et al.

(10) Patent No.: US 12,420,907 B2
(45) Date of Patent: Sep. 23, 2025

(54) FIXED-WING CONTROL MECHANISM

(71) Applicant: TUSAS—TURK HAVACILIK VE UZAY SANAYII ANONIM SIRKETI, Kahramankazan/Ankara (TR)

(72) Inventors: Fahrettin Ozturk, Kahramankazan/Ankara (TR); Mustafa Murat, Kahramankazan/Ankara (TR)

(73) Assignee: TUSAS—TURK HAVACILIK VE UZAY SANAYII ANONIM SIRKETI, Kahramankazan/Ankara (TR)

( * ) Notice: Subject to any disclaimer, the term of this patent is extended or adjusted under 35 U.S.C. 154(b) by 0 days.

(21) Appl. No.: 18/694,337

(22) PCT Filed: Jun. 28, 2022

(86) PCT No.: PCT/TR2022/050673
§ 371 (c)(1),
(2) Date: Mar. 21, 2024

(87) PCT Pub. No.: WO2023/055319
PCT Pub. Date: Apr. 6, 2023

(65) Prior Publication Data
US 2024/0400189 A1    Dec. 5, 2024

(30) Foreign Application Priority Data
Sep. 29, 2021   (TR) ................. 2021/015233

(51) Int. Cl.
*B64C 3/38*    (2006.01)
(52) U.S. Cl.
CPC ................... *B64C 3/385* (2013.01)

(58) Field of Classification Search
CPC .. B64C 3/385; B64C 3/48; B64C 5/08; B64C 1/26; B64U 30/12; B64U 50/24; B64U 10/25
See application file for complete search history.

(56) References Cited

U.S. PATENT DOCUMENTS 3,935,664 A * 2/1976 Neuhierl .............. A63H 27/001
446/61
9,376,207 B2 * 6/2016 Becklin .................. B64U 80/70
(Continued)

FOREIGN PATENT DOCUMENTS

| CN | 108750105 A | 11/2018 |
| CN | 110450938 A | 11/2019 |

(Continued)

OTHER PUBLICATIONS

International Search Report and Written Opinion for PCT application No. PCT/TR2022/050673, mailed Oct. 20, 2022.
(Continued)

*Primary Examiner* — Joshua D Huson
*Assistant Examiner* — Vicente Rodriguez
(74) *Attorney, Agent, or Firm* — Notaro, Michalos & Zaccaria P.C.

(57) ABSTRACT

The present invention relates to at least one fuselage located in an air and/or space vehicle, at least one structural part in the fuselage that supports an inner surface of the fuselage in terms of strength, a plurality of wings extending outward from the fuselage and providing the required lift force to the fuselag, a plurality of beams located in the wings to provide rigidity to wings, a plurality of openings located on the fuselage facing each other which allow the beams to extend into the fuselage and at least one actuator located in the fuselage allowing the beams to be actuated.

12 Claims, 5 Drawing Sheets

(56) References Cited

U.S. PATENT DOCUMENTS

| | | | | |
|---|---|---|---|---|
| 2006/0091258 A1* | 5/2006 | Chiu | ............... | B64U 50/19 |
| | | | | 244/119 |
| 2009/0302159 A1* | 12/2009 | Pajard | ............... | B64C 1/26 |
| | | | | 244/124 |
| 2011/0117806 A1* | 5/2011 | Frontera Castaner | ............... | |
| | | | | A63H 27/001 |
| | | | | 446/34 |
| 2018/0178910 A1* | 6/2018 | Har | ............... | B64C 29/02 |

FOREIGN PATENT DOCUMENTS

| | | | |
|---|---|---|---|
| CN | 112319793 A | 2/2021 | |
| KR | 20180076278 A | 7/2018 | |

OTHER PUBLICATIONS

Written Opinion mailed Jul. 28, 2023 and Reply for PCT application No. PCT/TR2022/050673 dated Sep. 21, 2023.
International Preliminary Report on Patentability for PCT application No. PCT/TR2022/050673, completed Oct. 4, 2023.

* cited by examiner

FIXED-WING CONTROL MECHANISM

The present invention relates to a fixed-wing control mechanism created for changing an incidence angle of wings and elevators in air vehicles.

The incidence angle of an air vehicle wing and elevator is determined at the conceptual design stage of the air vehicle and cannot be changed later. Such an angle for the wing is generally determined as an angle with a maximum ratio of CL (Lift Coefficient)/Cd (Drag Coefficient), which is the most efficient angle in terms of maximum endurance, at which the aircraft can stay in the air at max. Inability to change the incidence angle of the wing causes the approach speed of the aircraft to the runway and the speed required for the aircraft to take off from the runway to be high.

Patent document KR20180076278A, which is included in the known-state of the art, discloses take-off, landing, flight operations and in-flight energy generation. It discloses that when an air vehicle changes from horizontal to vertical flight, an axis of rotation of the wing and tail electric motor tilts in a direction perpendicular to the flight, and that at least two actuators attached to the fuselage tilt each of the wings during vertical flight. In addition, each of the wings is tilted independently by the actuator attached to the fuselage, the wings are tilted to make yaw and pitch movements, and the wings can also be tilted in opposite directions so that the aircraft can make the yaw movement.

The other patent document US20180178910A1, which is included in the known-state of the art, discloses an aerial vehicle. The aerial vehicle includes a main body; two main wings arranged to the main body; two main wing tilting control units coupled to the main wings to control the main wings to tilt independently; two main propulsion units arranged to the main wings; tail wings arranged to a rear side of the main body; a rudder arranged to the tail wing; a rudder tilting control unit to control the rudder to tilt; a tail propulsion unit arranged to the rear side of the main body; a tail tilting control unit to control the tail propulsion unit to tilt; a power unit to provide power to the main and tail propulsion units; and a position control unit to control the main wing tilting control units, the main propulsion units, the rudder tilting control unit, the tail propulsion unit, the tail tilting control unit to adjust position of the aerial vehicle.

Thanks to a fixed-wing control mechanism according to the present invention, changes in the incidence angle of the wing and elevators in air vehicles are provided more effectively.

Thanks to a fixed-wing control mechanism according to the present invention, an amount of energy required by the air vehicle during takeoff and landing is reduced.

A fixed-wing control mechanism realized to achieve the object of the invention and defined in the first claim and the claims dependent thereon comprises at least one fuselage constituting an air vehicle, i.e. a manned and/or unmanned air vehicle; at least one structural part located in the fuselage, which allows an inner surface of the fuselage to form a more rigid structure; a plurality of wings extending outwardly from the fuselage and providing the required lift force to the fuselage and the air vehicle; a plurality of beams that allow a rigid wing structure, with a wing strength inside the wings; a plurality of openings located facing each other on the fuselage to allow the beams in the wing to extend into the fuselage; at least one actuator located in the fuselage, which allows actuation of the beams allowing wing rigidity in the fuselage.

The fixed-wing control mechanism according to the invention comprises carrier elements located in the fuselage to face each other. The carrier elements are positioned on the same axis with the beams, wherein the beams are mounted on the carrier elements without a possibility be removed later. The carrier elements are triggered by the actuator, so that incidence angle of the wing is changed at a rate predetermined by the user, and the lift and drag forces acting on the air vehicle are changed.

In an embodiment of the invention, the fixed-wing control mechanism comprises a first wing and a second wing positioned to extend outwardly from the fuselage so as to be on the same axis with each other; a first beam and a second beam detachably mounted on the carrier element and extending in the first wing and the second wing towards each other so as to have a distance therebetween.

In an embodiment of the invention, the fixed-wing control mechanism comprises at least one bearing element positioned on the structural part; a first carrier element and a second carrier element located in the fuselage and positioned facing each other, on which the beams are detachably mounted; a plurality of adapters positioned in the fuselage so as to remain between the bearing elements and the first carrier element and the second carrier element, and detachably mounted on the first carrier element and the second carrier element, wherein a plurality of adapters allow the first carrier element and the second carrier element to be moved synchronously with each other when the actuator triggers the first carrier element and the second carrier element.

In an embodiment of the invention, the fixed-wing control mechanism comprises at least one stopper positioned on the structural part; at least one protrusion located such that the carrier extends outward from the adapters and is coaxial with the beams and which, as a result of contact with the stopper, allows the movement of the first carrier element and the second carrier element to be limited.

In an embodiment of the invention, the fixed-wing control mechanism comprises a first actuator which, when triggered, allows actuation of the first carrier element, wherein ends of the fist actuator are mounted on the first carrier element in a structurally removable manner; a second actuator which, when triggered, allows actuation of the second carrier element, wherein ends of the second actuator are connected to the second carrier element and the structural part.

In an embodiment of the invention, the fixed-wing control mechanism comprises the first carrier element and the second carrier element triggered by the first actuator and the second actuator in opposite directions so as to rotate around themselves on the axis they extend and supported on the bearing element that allows the rotational movement, thus allowing incidence angle of the wing to be changed.

In an embodiment of the invention, the fixed-wing control mechanism comprises at least one sensor which detects and collects the incidence angle data of the wings; at least one control unit which transmits a trigger command to the actuators in order to bring the wings to the incidence angle predetermined by the user, based on the data received from the sensor.

In an embodiment of the invention, the fixed-wing control mechanism comprises at least one connecting piece, which is detachably on the structural part between the actuator and the structural part and compensates the force exerted by actuators on the structural part.

In an embodiment of the invention, the fixed-wing control mechanism comprises at least one joint which is positioned to extend outwardly on the carrier elements and enables the carrier elements and actuators to be detachably connected to each other; a plurality of actuator connecting pieces positioned on the joint to rotate around themselves, which, when the actuators are triggered by the user, allow movement to be transferred so as to enable the carrier elements to rotate around the axis they extend.

In an embodiment of the invention, the fixed-wing control mechanism comprises the structural part positioned in the fuselage substantially surrounding an inner surface of the fuselage.

In an embodiment of the invention, the fixed-wing control mechanism comprises the first actuator and the second actuator, either a hydraulic cylinder or an electrically driven system.

In an embodiment of the invention, the fixed-wing control mechanism comprises the bearing element that is a bearing, a steel bush, or a brass bush.

In an embodiment of the invention, the fixed-wing control mechanism comprises at least one sealing element positioned between the wing and the fuselage in a form-fitting manner with the opening, and allowing the opening on the fuselage to be substantially sealed.

In an embodiment of the invention, the fixed-wing control mechanism comprises the sealing element made of rubber, metal or composite material.

In an embodiment of the invention, the fixed-wing control mechanism comprises the beam produced to have a C-form.

The fixed-wing control mechanism realized to achieve the object of the present invention is illustrated in the attached drawings, in which.

Figure 1:
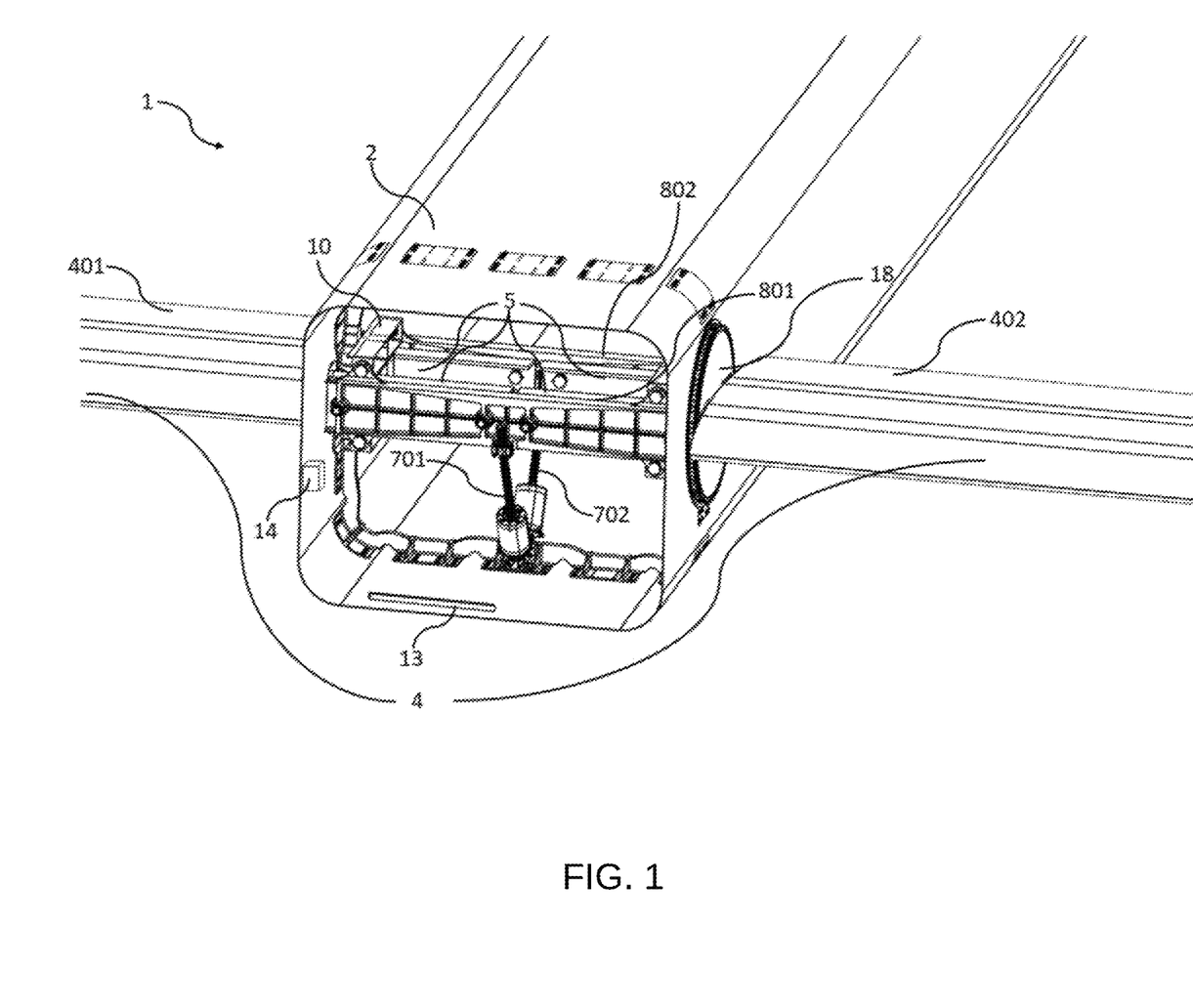
FIG. 1 is a perspective view of the Fixed-Wing Control Mechanism.

All the parts in the figures are individually assigned a reference numeral and the corresponding terms of these numbers are listed as follows:
1. Fixed-Wing Control Mechanism
2. Fuselage
3. Structural Part
4. Wing
401. First Wing
402. Second Wing
5. Beam
6. Opening
7. Actuator
701. First Actuator
702. Second Actuator
8. Carrier Element
801. First Carrier Element
802. Second Carrier Element
9. Bearing Element
10. Adapter
11. Stopper
12. Protrusion
13. Sensor
14. Control Unit
15. Connecting Piece
16. Joint
17. Actuator Connecting Piece
18. Sealing Element The fixed-wing control mechanism (1) comprises at least one fuselage (2) located in an air and/or space vehicle; at least one structural part (3) in the fuselage (2), which supports an inner surface of the fuselage (2) in terms of strength; a plurality of wings (4) extending outward from the fuselage (2) and providing the required lift force to the fuselage (2); a plurality of beams (5), which are located in the wings (4) to provide rigidity to wings (4); a plurality of openings (6) located on the fuselage (2) facing each other, which allow the beams (5) to extend into the fuselage (2); at least one actuator (7) located in the fuselage (2) and allowing the beams (5) to be actuated (FIG. 1).

Figure 4:
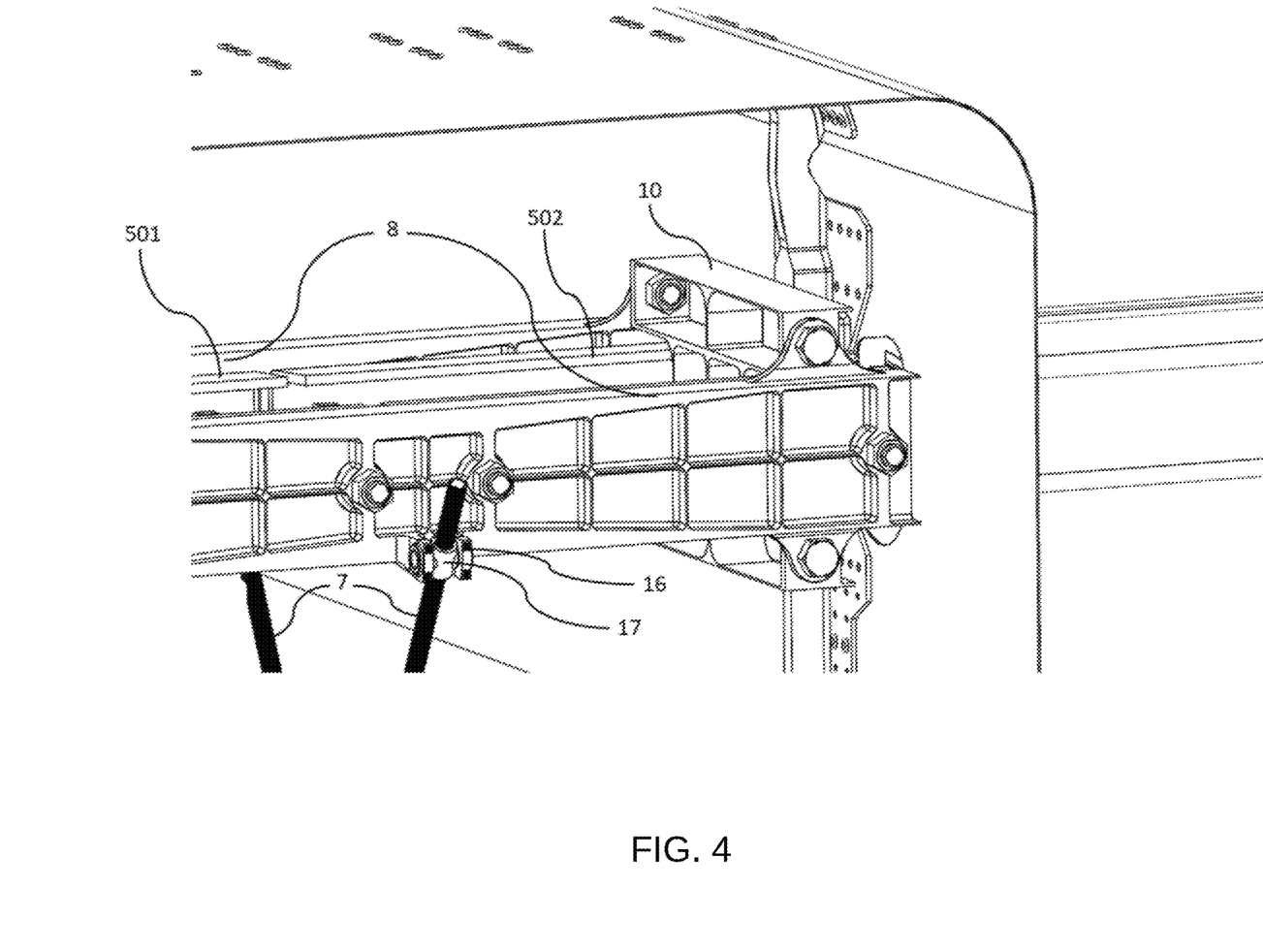
FIG. 4 is a perspective view of the Fixed-Wing Control Mechanism.

The fixed-wing control mechanism (1) according to the invention comprises a plurality of carrier elements (8) located on the fuselage (2) facing each other, in the same axis with the beams (5), which allow the beams (5) to be mounted thereon in a removable way, wherein if a plurality of carrier elements (8) is triggered by the actuator (7), they allow the wing (4) to be moved at an angle predetermined by the user and incidence angle of the wing (4) to be determined, thereby changing the lift and drag forces (FIG. 4).

A structural part (3) is provided on an inner surface of the fuselage (2) on air and/or space vehicles, which is positioned to provide rigidity to the fuselage (2). Wings (4) are provided on the fuselage (2) so as to extend outwardly from the fuselage (2), thereby creating the required lifting force for the air vehicle. There is a plurality of beams (5) located in the wings (4), extending along their length, which allow the creation of rigidity in the wings (4). A plurality of openings (6) are provided in the fuselage (2) to face each other, which allow the beams (5) in the wings (4), on the fuselage (2), to extend into the fuselage (2). There is provided at least one actuator (7) allowing the beams (5) and the wings (4) to be actuated, wherein the beams (5) are located in the wings (4), extend into the fuselage (2), and attached to the wings (4).

A plurality of carrier elements (8) are provided, on which the beams (5) in the fuselage (2) are mounted in a removable way. The carrier elements (8) are positioned in the fuselage (2) so as to face each other and parallel to the beams (5). The carrier elements (8) are actuated by the actuators (7), so that the beams (5) attached on the carrier element (8) are actuated to adjust the incidence angle of the wings (4) at the values predetermined by the user. Since incidence angle of the wings (4) of the air vehicle, i.e. an aircraft, can be changed, the approach speed of the air vehicle to the runway and the speed required for the air vehicle to take off from the runway can be reduced, and the values required for the air vehicle to stay in the air at maximum are provided.

In an embodiment of the invention, the fixed-wing control mechanism (1) comprises a first wing (401) and a second wing (402) extending outwardly from the fuselage (2) to be coaxial with each other; a first beam (501) and a second beam (502) located in the first wing (401) and the second wing (402), extending towards each other to have at least partially a distance therebetween, and removable mounted on the carrier element (8). In the first wing (401) and the second wing (402) extending outward from the fuselage (2), the first beam (501) and the second beam (502) is provided so as to extend into the fuselage (2). The first beam (501) extends into the fuselage (2) such that it faces the first wing (401) within the first wing (401). The second beam (502) extends into the fuselage (2) such that it faces the second wing (402) within the second wing (402). The first beam (501) and the second beam (502) are mounted on the carrier elements (8) within the fuselage (2) so as to have a partial distance therebetween. In this way, the loads that are compensated by the beams (5) over two separate wings (4) are transferred to the carrier elements (8).

Figure 2:
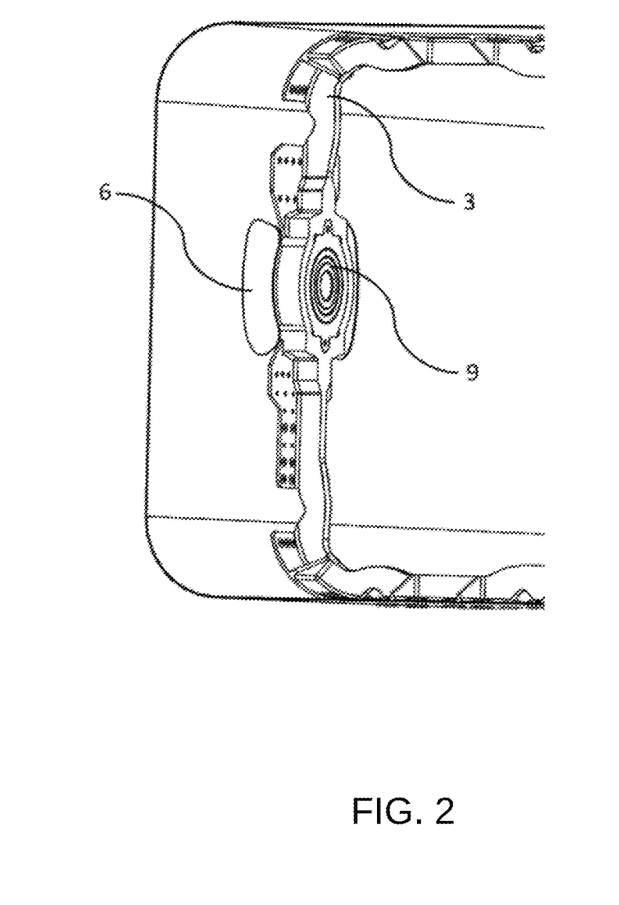
FIG. 2 is a perspective view of the Fuselage, Opening and Structural Part.

In an embodiment of the invention, the fixed-wing control mechanism (1) comprises at least one bearing element (9) located on the structural part (3) and allowing rotational movement; a first carrier element (801) and a second carrier element (802) located in the fuselage (2) facing each other, on which the beams (5) are mounted in a removable way; a plurality of adapters (10) located in the fuselage (2) facing each other, which are mounted detachably on the carrier elements (8) so as to remain between the bearing element (9) and the first carrier element (801) and the second carrier element (802), wherein a plurality of adapters (10), when triggered by the actuator (7), allow the first carrier element (801) and the second carrier element (802) to be moved simultaneously. The bearing element (9) is located on the structural part (3), between the openings (6). The first beam (501) and the second beam (502), which extend into the fuselage (2) and are located facing each other, are detachably mounted on the first carrier element (801) and the second carrier element (802) inside the fuselage (2). Therefore, the loads on the beams (5) are carried by the first carrier element (801) and the second carrier element (802). A plurality of adapters (10) is provided in the fuselage (2) facing each other, which are located in the fuselage (2) so as to remain between the first carrier element (801) and the second carrier element (802) and contact the bearing elements (9). The adapters (10) allow the carrier elements (8) triggered by the actuator (7) to move in connection with each other. In addition, after the first carrier element (801) and the second carrier element (802) are triggered by the actuator (7), the wings (4) can be moved to change the incidence angle (FIG. 2).

Figure 3:
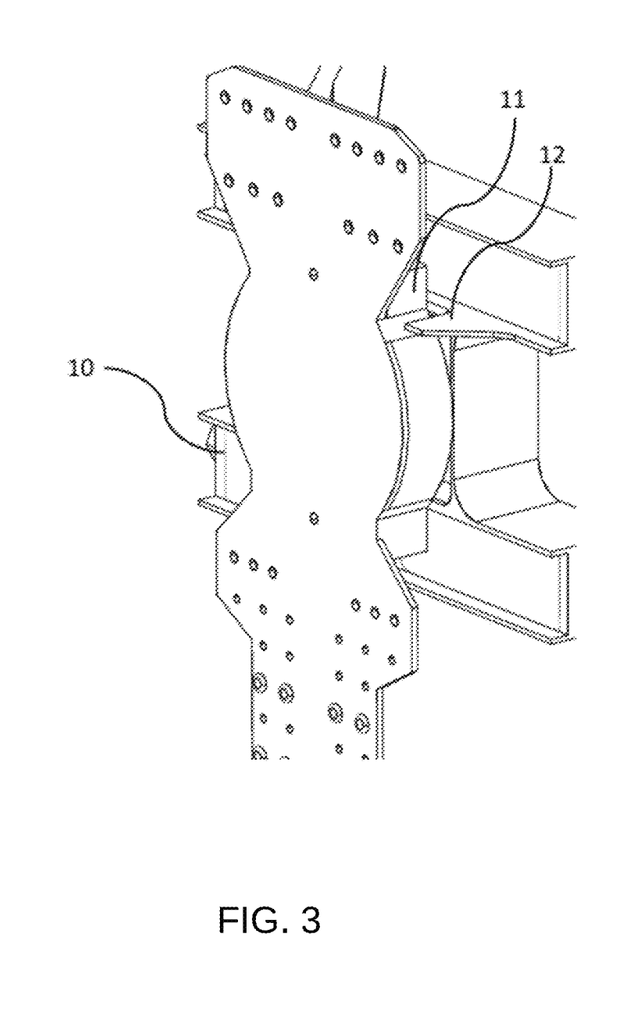
FIG. 3 is a perspective view of the Adapter and Protrusion.
Figure 5:
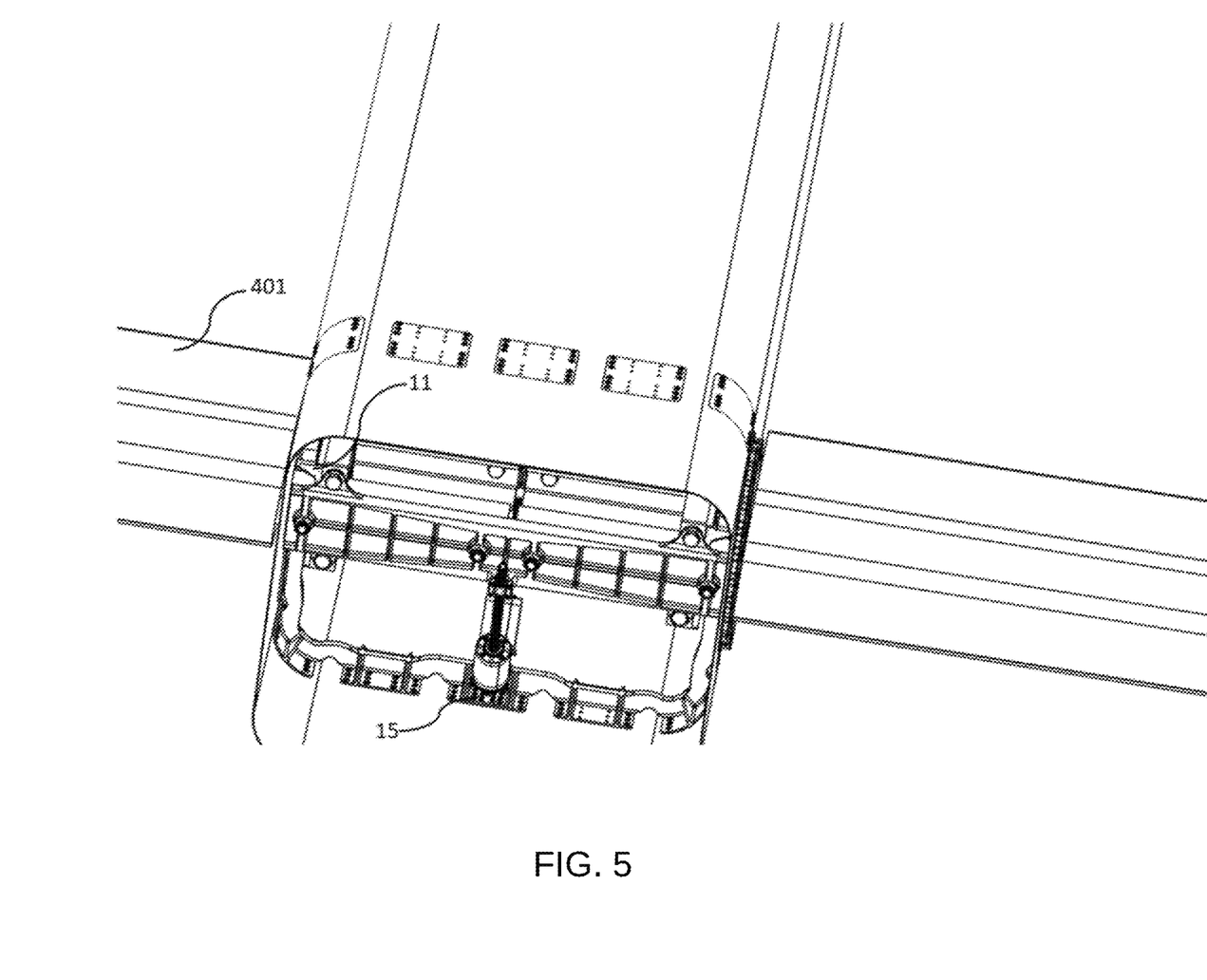
FIG. 5 is a perspective view of the Fixed-Wing Control Mechanism.

In an embodiment of the invention, the fixed-wing control mechanism (1) comprises at least one stopper (11) located on the structural part (3); at least one protrusion (12) extending outward from the adapters (10) in the same axis with the beams (5), which limits the movement of the first carrier element (801) and the second carrier element (802) as a result of contacting the stopper (11), as predetermined by the user. After the first carrier element (801) and the second carrier element (802) are triggered by the actuator (7), the wings (4) are actuated by means of the bearing element (9) to change the incidence angle. When the protrusions (12) on the adapters (10) contacts the stoppers (11) on the structural part (3), the rotational movement of the wing (4) takes place within the limits predetermined by the user (FIG. 3, FIG. 5).

In an embodiment of the invention, the fixed-wing control mechanism (1) comprises a first actuator (701), with one end connected to the first carrier element (801) and one end to the structural part (3) in a removable manner, which allows the first carrier element (801) to be actuated; a second actuator (702), with one end connected to the second carrier element (802) and one end to the structural part (3) in a removable manner, which allows the second carrier element (802) to be actuated. The first actuator (701) and the second actuator (702) allow the first carrier element (801) and the second carrier element (802) to be actuated, respectively, in order to change the incidence angle of the wings (4). The first actuator (701) and the second actuator (702) are triggered simultaneously or providing redundancy to each other in order to change the incidence angle of the wing (4) at a rate predetermined by the user.

In an embodiment of the invention, the fixed-wing control mechanism (1) comprises the first carrier element (801) and the second carrier element (802), which are actuated by the first actuator (701) and the second actuator (702) so as to rotate around themselves along the axis they extend, in opposite directions with respect to each other, and to be supported by the bearing element (9), thus allowing incidence angle of the wing (4) to be changed. The first carrier element (801) is triggered by the first actuator (701). The second actuator (702) actuates the second carrier element (802) simultaneously or in redundancy with the first actuator (701). After the first carrier element (801) and the second carrier element (802) are triggered by the actuators (7), they perform a rotational movement on the bearing element (9), synchronized to each other, by means of the adapters (10). Thus, they are moved by rotating along the axis they extend, so that incidence angle of the wing (4) is changed.

In an embodiment of the invention, the fixed-wing control mechanism (1) comprises at least one sensor (13) located on the fuselage (2) and measuring the incidence angle data of the wings (4); at least one control unit (14) to which data is transmitted from the sensor (13) and which allows the actuators (7) to be triggered in order to bring the wings (4) to the incidence angle predetermined by the user. The first actuator (701) and the second actuator (702) are triggered by means of the control unit (14) by the user using the incidence angle data contained in the sensors (13), during the short-range takeoff, short-range stopping and/or maneuvering of the air vehicle. Therefore, the incidence angle of the wing (4) can be changed by actuating the carrier elements (8).

In an embodiment of the invention, the fixed-wing control mechanism (1) comprises at least one connecting piece (15) located between the actuator (7) and the structural piece (3), mounted on the structural piece (3) in a removable manner, and compensating the force exerted by the actuators (7). The actuators (7) are mounted detachably on the connecting piece (15) and carrier elements (8) positioned on the structural part (3). Thanks to the connecting piece (15), the load transferred to the structural part (3) is dissipated by the first actuator (701) actuating the first carrier element (801) and the second actuator (702) actuating the second carrier element (802), thus reducing the stress on the structural part (3). Therefore, it is enabled that possible damages occur not on the structural part (3) but on the user-replaceable connecting piece (15).

In an embodiment of the invention, the fixed-wing control mechanism (1) comprises at least one joint (16) which extends outward from the carrier element (8) and allows the carrier elements (8) to be connected to the actuators (7) in a removable manner; at least one actuator connecting piece (17) located on the joint (16) so as to rotate around itself, which allows the carrier elements (8) to rotate along the axis they extend when the actuators (7) are triggered. There are joints (16) on the carrier elements (8) in order to be mounted with the tip of the actuator (7). At least one actuator connecting piece (17) rotatable around itself is provided on the joint (16), in order to maintain the rotational movement of the carrier elements (8), which are actuated by the actuators (7) applying a linear force.

In an embodiment of the invention, the fixed-wing control mechanism (1) comprises the structural part (3), which is located in the fuselage (2) so as to substantially surround an inner surface of the fuselage (2). Changing the incidence angle of the wings (4) creates a lattice structure by means of the structural part (3), which is located such that the carrier elements (8) and the adapters (10) substantially surround the inner side of the fuselage (2).

In an embodiment of the invention, the fixed-wing control mechanism (1) comprises the first actuator (701) and the second actuator (702), which are electrically-driven or provided as hydraulic cylinders. Actuators (7), which are electrically-driven or provided as hydraulic cylinders, are triggered by the control unit (14).

In an embodiment of the invention, the fixed-wing control mechanism (1) comprises the bearing element (9) which is a bearing, steel bush or brass bush.

In an embodiment of the invention, the fixed-wing control mechanism (1) comprises at least one sealing element (18) which is located on the fuselage (2), form-fitting with the opening (6), thus substantially preventing a flow of liquid which may leak into the fuselage (2) through the beam (5).

In an embodiment of the invention, the fixed-wing control mechanism (1) comprises the sealing element (18) made of rubber, metal or composite material.

In an embodiment of the invention, the fixed-wing control mechanism (1) comprises a C-shaped beam (5).

The invention claimed is:

1. An air and/or space vehicle comprising:
    at least one fuselage (2) located in an air and/or space vehicle;
    at least one structural part (3) in the fuselage (2) which supports an inner surface of the fuselage (2) in terms of strength;
    a plurality of beams (5) which are located in wings (4) to provide rigidity to the wings (4);
    a plurality of openings (6) located on the fuselage (2) facing each other which allow the plurality of beams (5) to extend into the fuselage (2);
    at least one actuator (7) located in the fuselage (2) for actuating the plurality of beams (5), a fixed-wing control mechanism (1), which comprises;
    a plurality of carrier elements (8) located on the fuselage (2) facing each other, in a same axis with the plurality of beams (5), so that the plurality of beams (5) are mounted thereon, wherein when the plurality of carrier elements (8) are triggered by the actuator (7), one of the wings (4) is moved at an angle predetermined by a user and to be brought to an incidence angle of that one wing (4), thereby changing lift and drag forces;
    a first wing (401) and a second wing (402) among the wings (4) extending outwardly from the fuselage (2) and coaxial with each other;
    a first beam (501) among the plurality of beams (5) located in the first wing (401) and a second beam (502) among the plurality of beams (5) located in the the second wing (402), the first beam (501) and the second beam (502) extending towards each other to have at least partially a distance therebetween, and detachably mounted on one of the plurality of carrier elements (8);
    at least one sealing element (18) which is located on the fuselage (2), form-fitting with one of the plurality of openings (6), thus substantially preventing a flow of liquid which may leak into the fuselage (2) through the plurality of beams (5);
    the fixed-wing control mechanism (1), which comprises at least one bearing element (9) located on the structural part (3) facing the opening (6), and allowing rotational movement of the structural part (3); and
    a first carrier element (801) and a second carrier element (802) located in the fuselage (2) facing each other, on which the plurality of beams (5) are mounted, a plurality of adapters (10) located in the fuselage (2) facing each other, which are mounted detachably on the plurality of carrier elements (8) so as to remain between the bearing element (9) and the first carrier element (801) and the second carrier element (802), wherein the plurality of adapters (10), when triggered by the actuator (7), allow the first carrier element (801) and the second carrier element (802) are moved simultaneously.

2. The air and/or space vehicle according to claim 1, wherein the fixed-wing control mechanism (1) comprises:
    at least one stopper (11) located on the structural part (3); and
    at least one protrusion (12) extending outward from the adapters (10) in the same axis with the plurality of beams (5), which limits movement of the first carrier element (801) and the second carrier element (802) as a result of contacting the stopper (11), as predetermined by the user.

3. The air and/or space vehicle according to claim 1, comprising:
    a first actuator (701) with one end connected to the first carrier element (801) and one end to the structural part (3), for actuating the first carrier element (801); and
    a second actuator (702), with one end connected to the second carrier element (802) and one end to the structural part (3), for actuating the second carrier element (802).

4. The air and/or space vehicle according to claim 1, wherein the first carrier element (801) and the second carrier element (802) each has an axis extending along a length thereof and wherein the first carrier element (801) and the second carrier element (802) are actuated by the first actuator (701) and the second actuator (702), respectively, so as to rotate around the respective axis thereof, in opposite directions with respect to each other, and to be wherein the first carrier element (801) and the second carrier element (802) are supported by the bearing element (9), so that the incidence angle of one of the wings (4) is changed upon actuation of the first actuator (701) and/or the second actuator (702).

5. The air and/or space vehicle according to claim 1, wherein the fixed-wing control mechanism (1) comprises:
    at least one sensor (13) located on the fuselage (2) and measuring the incidence angle of the wings (4); and
    at least one control unit (14) to which data is transmitted from the sensor (13) so that the actuators (7) are triggered to bring the wings (4) to the incidence angle predetermined by the user.

6. The air and/or space vehicle according to claim 1, wherein the fixed-wing control mechanism (1) comprises at least one connecting piece (15) located between the actuator (7) and the structural part (3), mounted on the structural piece (3), and compensating the force exerted by the actuators (7).

7. The air and/or space vehicle according to claim 1, wherein the fixed-wing control mechanism (1) comprises:
    at least one joint (16) which extends outward from one of the plurality of carrier elements (8) so that the plurality of carrier elements (8) are connected to the actuators (7); and
    at least one actuator connecting piece (17) located on the joint (16), which allows the plurality of carrier elements (8) to rotate along an axis of extension thereof when the actuators (7) are triggered.

8. The air and/or space vehicle according to claim 1, wherein the structural part (3) is located in the fuselage (2) so as to substantially surround an inner surface of the fuselage (2).

9. The air and/or space vehicle according to claim 3, wherein the first actuator (701) and the second actuator (702) are electrically-driven or provided as hydraulic cylinders.

10. The air and/or space vehicle according to claim 1, wherein the bearing element (9) is a bearing, steel bush or brass bush.

11. The air and/or space vehicle according to claim 1, wherein the sealing element (18) is made of rubber, metal or composite material.

12. The air and/or space vehicle according to claim 1, wherein the plurality of beams (5) are C-shaped, I-shaped or has a square form.

\* \* \* \* \*